United States Patent [19]
Herbert et al.

[11] Patent Number: 5,734,800
[45] Date of Patent: Mar. 31, 1998

[54] SIX-COLOR PROCESS SYSTEM

[75] Inventors: Richard Herbert, Boonton Township, N.J.; Al DiBernardo, Blauvelt, N.Y.

[73] Assignee: Pantone, Inc., Carlstadt, N.J.

[21] Appl. No.: 346,112

[22] Filed: Nov. 29, 1994

[51] Int. Cl.⁶ .............................. H04N 1/50; H04N 1/56; H04N 1/60

[52] U.S. Cl. .................. 395/109; 358/501; 358/518; 358/523

[58] Field of Search ............................. 395/109; 358/504, 358/523, 501, 518, 536

[56] References Cited

U.S. PATENT DOCUMENTS

| | | | |
|---|---|---|---|
| 4,812,899 | 3/1989 | Kueppers. | |
| 4,878,977 | 11/1989 | Kueppers. | |
| 5,339,176 | 8/1994 | Smilansky et al. | 358/504 |
| 5,398,121 | 3/1995 | Kowalewski et al. | 358/504 |
| 5,416,613 | 5/1995 | Rolleston et al. | 358/504 |
| 5,481,380 | 1/1996 | Bestmann | 358/504 |

OTHER PUBLICATIONS

*A Color to Colorant Tranformation for a Seven Ink Process,* Science and Technology, Harold Boll, Feb. 6–10, 1994.
Swop, Specifications Web Offset Publications, 1993.

*Primary Examiner*—Scott Rogers

[57] ABSTRACT

A printing system for high fidelity printing of an image is provided comprising a print grid including a combination of the color black and five discrete basic ink colors, at least three colors having at least a portion of fluorescent. The printing system includes a spectrophotometer for measuring the color combination in the print grid. A plotter is used to plot readings from the spectrophotometer in CIE color space and creates a look up table based on the readings. A scanner then scans the image in RGB format and converts the scanned information into XYZ coordinates to be plotted in CIE color space. Thereafter, the scanner determines from the look up table the color combination for each scanned spot. In an exemplary embodiment, the five basic ink colors may be selected from a group of colors from the PANTONE MATCHING SYSTEM®, while the fluorescent may be selected from a group consisting of PANTONE Fluorescents.

13 Claims, 5 Drawing Sheets

FIG. 1

FIG.2 — HEXACHROME, SWOP

FIG.3 — HEXACHROME, KÜPPERS

SIX-COLOR PROCESS SYSTEM

This invention relates to a six color process printing system, and in particular, to a printing system having a print grid using a combination of the color black and five basic ink colors with three colors being part fluorescent to create high fidelity color reproductions.

Various forms of full color print reproduction have been demonstrated over the years. Today, the most prevalent type of color printing is by a standard four color process. To produce natural images on a printing press or color proofing printers, a combination of subtractive primary colors are placed on paper to adequately reproduce the original scene, or more likely, the photographic transparency. Unfortunately, the subtractive primaries that are used to conform to economic standards are not necessarily quality standards. In the United States, one such standard is SWOP or Specifications for Web Offset Publications (See Specifications For Color Separations And Proofing, the SWOP™ Booklet, April, 1993). While the SWOP specification works well and reproduces high quality imagery, printing presses can achieve even superior results. Designers and their clients are aware of this fact, and in turn, are demanding higher quality and fidelity.

For decades, printers have been providing their customers with enhanced color and fidelity by adding touch plate tricks with ink or varnish to boost colors in an image, adding spot/solid color inks for high impact effects or increasing line screen to sharpen the image. While these methods are effective, they are performed on an ad-hoc basis where decisions are made on a job-by-job basis. Since most pre-press houses and printers are now utilizing digital imaging techniques and equipment, customized enhancement may not be necessary to achieve high impact or high fidelity results.

In today's marketplace, high fidelity color may sometimes be referred to synonymously with a seven color process. Part of the reason why high fidelity color has not become more widespread is that most printers are not capable of printing seven colors on a single pass through the printing press, unless they have a 7 or 8-color press, an uncommon item in the industry.

More specifically, in a 4-color process system, colors are generated by overprinting solid areas and dots of yellow, magenta, cyan and black inks. It is common knowledge that these colors will generate a limited, though practical, color space. This lack of color saturation is especially noted in the 2-color overprints (i.e., Yellow+Magenta=Red, Yellow+Cyan=Green, and Magenta+Cyan=Blue).

The volume of this color space, or color gamut, can be expanded significantly by substituting single pigmented inks for the overprints. These inks are highly saturated in color, but they convert a 4-color process system into a 7-color process system: Yellow-Orange or Red-Magenta-Blue-Cyan-Green-Black. Seven color printing is disclosed in greater detail in U.S. Pat. Nos. 4,812,899 and 4,878,977 issued to Harald Küeppers and such patents are incorporated herein by reference.

A 7-color process system requires a 7 or 8-color printing press to produce the appropriate output. Since 7 or 8-color printing presses are not common items in most printing plants, many problems arise. Alternately, a 7-color process system may be run twice through a 4-color printing press: first with four colors and then with three colors. However, it is very difficult to maintain good register of the image on the second pass through. This difficulty is a result of the initial water picked up by the paper in the first pass through and temperature variations distorting the paper, thereby distorting the image being printed on the second pass.

The key to success for any system to work or become a standard in the industry is its commercial viability on a reasonably large scale. Existing technology and equipment must be compatible with a new or different printing process. Specifically, better color and screening must be achievable on current systems and presses.

Another important aspect of the present invention is that it requires a new method for color separation and color correction. This method is different than the one used in conventional four color process. In any color reproduction process, the goal is to match the red, green and blue reflectance from each spot on the original artwork, because this is how the eye perceives color. For color television, for example, an electron beam gun activates phosphors to glow red, green or blue. Starting with a dark screen, the exact amount of red, green and blue ("RGB") is activated at each spot to match the original. This is known as an additive mixture, and the RGB lights are the additive primaries.

In printing, the process begins with white paper that has a high RGB reflectance. To print, a cyan ink film is used to act as a filter to selectively absorb red light, a magenta ink film is used as a filter to selectively absorb green light, and a yellow ink film is used as a filter to selectively absorb blue light. The desired amount of RGB light may be absorbed and subtracted from the white paper at each spot until it matches the original. This is known as a subtractive mixture and the cyan, magenta and yellow colors ("CMY") are the subtractive primaries.

Today, the following methods are used in graphic arts industry. Photographic red, green, and blue filters are used to color separate original artwork (color transparencies, reflective art, and the like). The film negatives obtained are a record of the RGB reflectance or transmittance of every spot on the artwork. These negatives are used to make the cyan, magenta and yellow printing plates. A black printing plate is added to obtain increased density in the shadow areas, and is made by shooting film at ⅓ exposure through each of the RGB filters. The black plate is also used to print type. The CMY inks are not ideal in the sense that cyan absorbs only red, magenta absorbs only green, and yellow absorbs only blue. Cyan also absorbs some green and blue, and magenta also absorbs some blue. Yellow ink is almost ideal so it usually is not corrected. Therefore, color correction is required.

The RGB film color separation negatives determines how much CMY ink needs to be printed at each spot. However, for example, the magenta ink also absorbs some blue light, which means that it is partially also acting as a yellow ink. Therefore, any areas where yellow and magenta ink print together, it will look too yellow compared to the original artwork. The only way to control this would be to subtract some yellow ink in these areas. This is done with photographic masks.

A skeleton positive image of the green separation negative (magenta printer) is made. This skeleton image or photographic mask is placed in register with the blue separation negative, and the yellow printing plate is made. In those areas where yellow and magenta will print together, there is increased photographic film density, and less yellow ink will print. The cyan ink is corrected in a similar manner.

Other corrections that need to be made are called UCR (Under Color Removal), and GCR (Gray Component Replacement). With UCR, any areas that are printing with YMC (i.e. yellow, magenta and cyan) are replaced with black. This was a big advantage in letterpress printing, because printing thick ink films of YMC on top of each other with applied pressure from the printing plate, resulted in a mottled, squashed look. Therefore, for letterpress printing, 100% UCR was applied. This was also cheaper since black ink was less expensive than colored inks. However, for lithographic printing where much thinner ink films are printed, it is common practice to include YMC along with black to increase density and detail in the shadow areas. Typically, 10–60% UCR is applied to lithographic printing.

With GCR, one of the process colors in a 3-color print that behaves like a complementary color and adds gray to the print is replaced with black. For example, a dirty looking red is made with YMC. In this case, the cyan is the complementary color to red and is the graying agent. By replacing cyan with black, the color remains more consistent during a production run because black moving up and down in ink film is not as bad as cyan moving up and down. Cyan changes the grayness and blueness of the color as it changes ink film. Again, for lithographic printing 100% GCR is not applied, because having four ink films printing in one area adds density.

Figure 1:
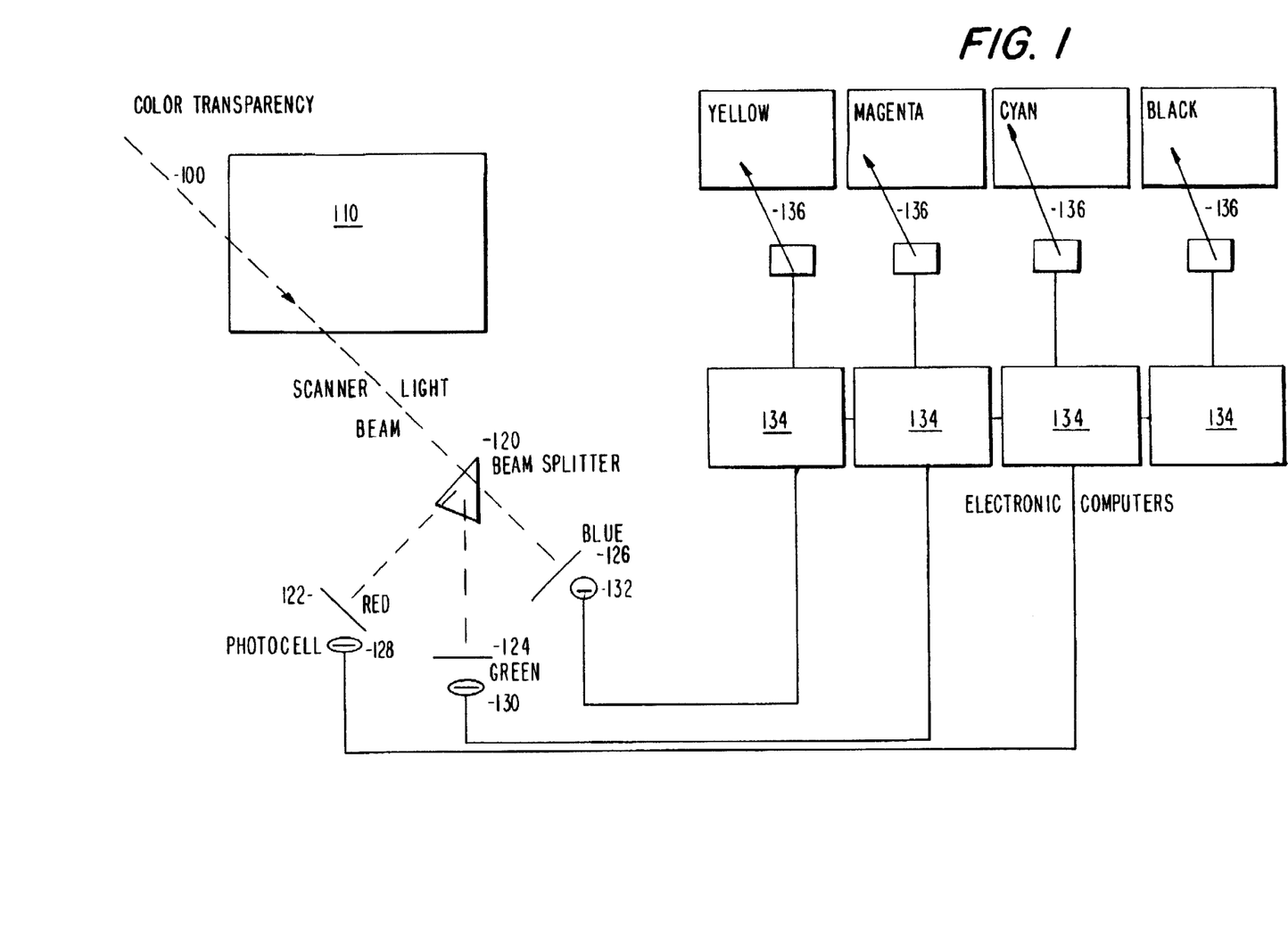
FIG. 1 is a schematic diagram showing a three color corrected separation system.

Electronic color scanners can now do all the color separation and color corrections needed for four color process printing. A schematic diagram is shown in FIG. 1. As shown in FIG. 1, the scanner enables a white light beam 100 to pass through a spot of color transparency 110 and is broken into three beams by the beam splitter 120. One beam passes thorough a red filter 122, another through a green filter 124 and the third through a blue filter 126. Photocells 128, 130 and 132 pick up the red, green and blue signals respectively and transfers them to the computers, which color correct for process ink deficiencies, UCR, GCR, and the like. These modified signals trigger laser beams 136, which expose dots on film to make the YMCK negatives.

Today's scanners can also output this YMCK information to a disc, or display it directly on a computer color monitor for further corrections and adjustments. Since the color monitor images are in RGB, there is no need to scan it. It can be output directly to a disc. The discs are placed in imagesetters which prepare film for plate making.

Accordingly, it is desired to provide an improved printing system capable of using existing printing equipment, but creating high fidelity color output. The printing system of the present invention is constructed by means of a print grid including the color black and a combination of five basic ink colors comprising at least three colors, part of which are fluorescent.

SUMMARY OF THE INVENTION

Generally, in accordance with the invention, a printing system for high fidelity printing of an image is provided comprising a print grid including a combination of the color black and five discrete basic ink colors, at least three colors having at least a portion of fluorescent. The printing system includes a spectrophotometer for measuring the color combination in the print grid. A plotter is used to plot readings from the spectrophotometer in CIE color space and creates a look up table based on the readings. A scanner then scans the image in RGB format and converts the scanned information into XYZ coordinates to be plotted in CIE color space. Thereafter, the scanner determines from the look up table the color combination for each scanned spot. In an exemplary embodiment, the five basic ink colors may be selected from a group of colors from the PANTONE MATCHING SYSTEM®, while the fluorescent may be selected from a group consisting of PANTONE Fluorescents.

Accordingly, it is an object of the invention to create a six color process system.

It is still another object of the invention to create a colorant set that can reproduce the dynamic range of color positive film and solid ink colors.

Yet another object of the invention is to create a high fidelity color system that may be used with conventional and readily available printing equipment.

Yet still another object of the invention is to create a high fidelity color system that communicates with a wider range of tones, more precise shades and cleaner more brilliant hues.

Still other objects and advantages of the invention will in part, be obvious, and will, in part, be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

In order to determine which primary colors to select to create a six-color process system, several factors need to be taken into account. These factors include color gamut, color separations, printing press workability, light fastness, print density, and the subject matter to be printed. The goal is to create a colorant set that can reproduce the dynamic range of color positive film and achieve spot or solid ink colors.

Figure 2:
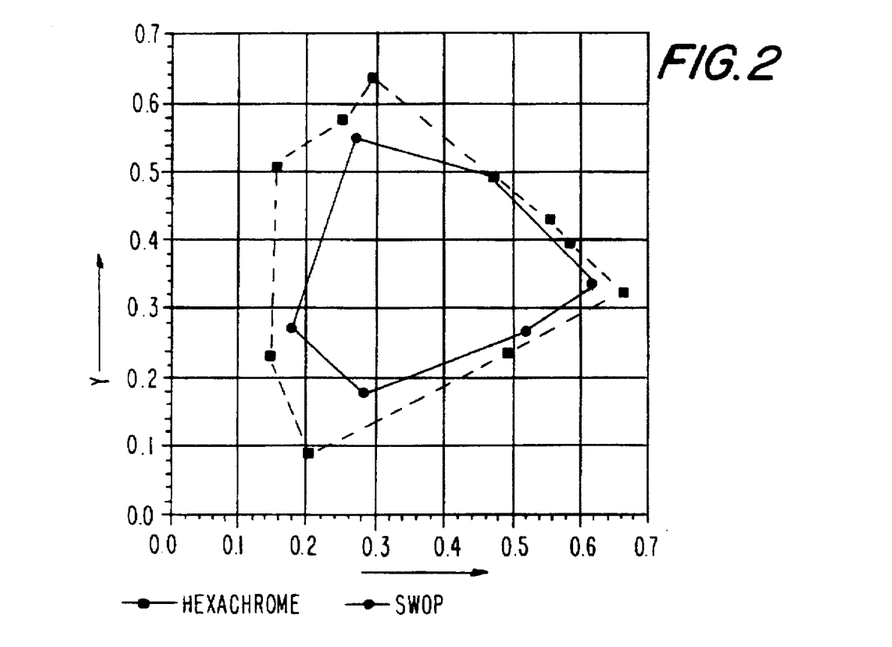
FIG. 2 is a graph disclosing the relationship between a SWOP 4-Color process system and the color gamuts of the present invention in a C.I.E. Chromaticity Diagram.

Referring specifically to FIG. 2, two color gamuts placed on a C.I.E. Chromaticity Diagram are shown. The solid line correlates to the boundary of the SWOP 4-color process system, while the dashed line correlates to the present invention. As shown, the color gamut or the number of colors that can be reproduced by the six-color process system is significantly greater than the SWOP system.

Figure 3:
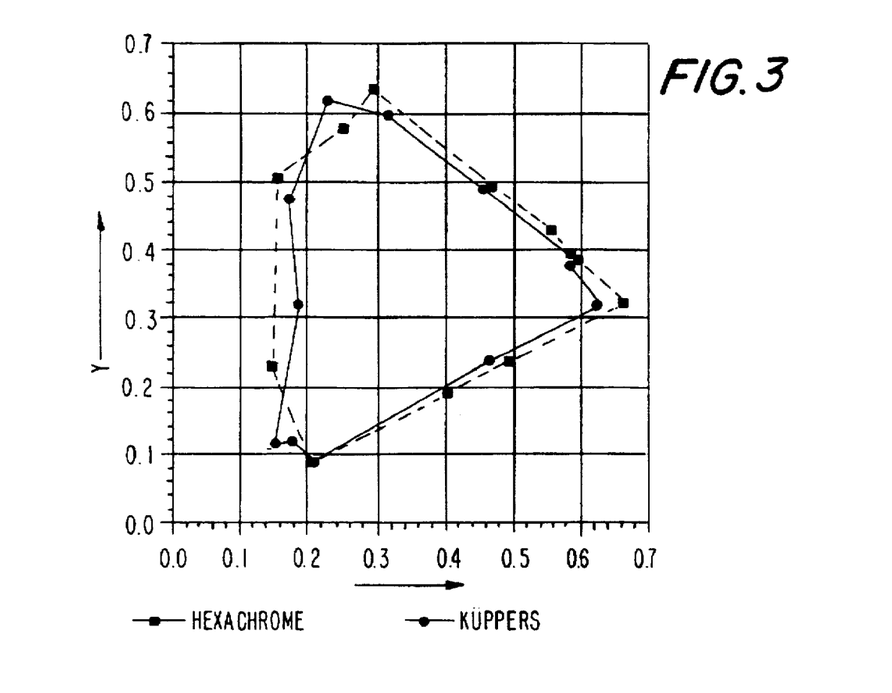
FIG. 3 is a graph disclosing the relationship between a seven color printing system and the six color process system of the present invention in a C.I.E. Chromaticity Diagram.

A comparison of the present invention with the 7-color Kueppers color space disclosed in the Background of the Invention is shown in FIG. 3. The solid line correlates to the seven color system, while the dashed line correlates to the present invention. As demonstrated, seven colors do not necessarily mean better color. While the color gamuts are close, the six color system provides better greens, yellows, oranges and reds. The differences are based on the fact that the seven color model incorporates cyan, magenta and yellow inks that are similar to standard process inks. The addition of the colors violet, orange and green does not provide the largest possible color gamut. The six color system, on the other hand, includes five colors together with black that are custom formulated and optimized with fluorescent inks to span a very large color space.

Figure 4:
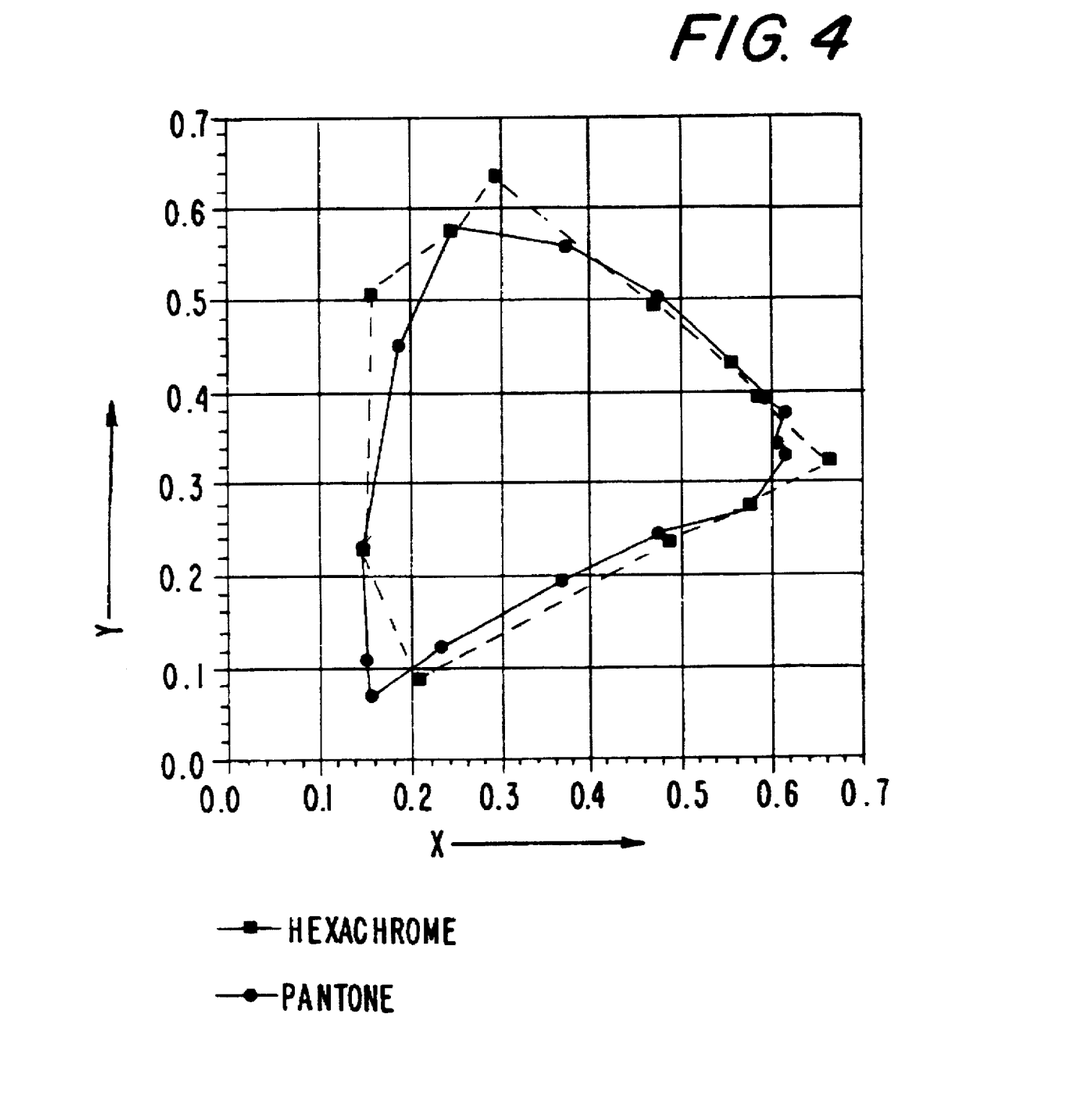
FIG. 4 is a graph disclosing the relationship between PANTONE MATCHING SYSTEM colors and a hexachromatic six color printing system of the present invention in a C.I.E. Chromaticity Diagram.

Referring specifically to FIG. 4, two color gamuts placed on a chromaticity diagram are shown. The solid line correlates to the boundary of the PANTONE MATCHING SYSTEM® developed by Pantone, Inc., while the dashed line correlates to the present invention. The PANTONE MATCHING SYSTEM is a color standard system presently available in the marketplace. As shown, the areas are essentially the same with the six color gamut stronger in the greens, yellows, oranges, and reds. Because the PANTONE MATCHING SYSTEM is a solid color system made up of 12 base colors as opposed to six for the present process colors invention, it is difficult to create a one-to-one correlation.

The present invention creates a six color printing system, which allows a user to use a combination of basic colors, fluorescent colors and black to reproduce the greatest possible, practical color gamut. This system provides the best combination of colors for the particular press being used and the artwork being reproduced.

In an exemplary embodiment, the process colors for the combination may be selected from the following list of PANTONE® Basic Colors that use conventional ink pigments and ink vehicles. PANTONE Basic Colors are readily available in the marketplace. The non-exhaustive list of PANTONE® Basic Colors that may be used, include:

PANTONE Yellow
PANTONE Yellow 012
PANTONE Yellow 013
PANTONE Process Yellow
PANTONE Orange 021
PANTONE Warm Red
PANTONE Red 032
PANTONE Red 033
PANTONE Rubine Red
PANTONE Magenta 052
PANTONE Process Magenta
PANTONE Process Black
PANTONE Rhodamine Red
PANTONE Purple
PANTONE Violet
PANTONE Violet 063
PANTONE Blue 072
PANTONE Reflex Blue
PANTONE Process Cyan
PANTONE Process Blue
PANTONE Blue 082
PANTONE Green
PANTONE Green 092

In an exemplary embodiment, the fluorescent colors may be selected from the following non-exhaustive list of PANTONE fluorescent including:

PANTONE Fluorescent Blue 801
PANTONE Fluorescent Green 802
PANTONE Fluorescent Yellow 803
PANTONE Fluorescent Orange 804
PANTONE Fluorescent Warm Red 805
PANTONE Fluorescent Magenta 806
PANTONE Fluorescent Purple 807

An ideal six-color process system can closely duplicate the color gamut of a seven color process as shown in FIG. 3. This result can be attained, if three of the primary colors are more highly saturated than the corresponding conventional process primaries. The higher saturation occurs when a primary color is mixed with a fluorescent. For example, a fluorescent yellow color is more saturated than a conventional process yellow color, and a fluorescent magenta color is more saturated than a conventional magenta process color. This means that the overprints of fluorescent yellow and fluorescent magenta will produce a more saturated orange or red color, which can be as saturated as the single pigmented orange or red prints.

The principle of fluorescence, described by Stokes' Law, states that a material will fluoresce only by taking light of short wavelength—high energy, and converting it to a fluorescent light at longer wavelengths—lower energy. For daylight fluorescing pigment colors, the kind used in printing inks, a fluorescent blue print can only convert violet light to blue light. Therefore, blue fluorescent colors are not much brighter or saturated than a non-fluorescent blue color. A green fluorescent color can convert violet and blue light to green, a yellow fluorescent color can convert violet, blue and green light to yellow, and a red fluorescent color can convert all the spectrum lights up to red light. Accordingly, a red fluorescent color is the brightest.

In creating a combination of process and fluorescent colors, it is best to substitute fluorescent yellow, fluorescent orange and fluorescent magenta for process yellow, orange and magenta, rather than substituting for process blue, cyan or green. It is noted that the use of straight fluorescent ink has some drawbacks. These drawbacks include less light fastness, strength and printing characteristics, than conventional inks. However, when fluorescent inks are blended with conventional inks, these deficiencies are markedly reduced.

For the purposes of creating a six color system, any combination of fluorescent and conventional ink is possible. The Day-Glo Corporation recommends to use straight fluorescent inks as a 4-color process system to produce more saturated colors. However, this idea has not gained industry popularity, because there is no simple method for obtaining good color separations to accurately duplicate the original artwork or color transparency. In addition, the above mentioned deficiencies of fluorescent inks affect the quality of the printed artwork.

An exemplary embodiment of the six color process uses yellow-orange-magenta-cyan-green and black. In this combination, the yellow, orange and magenta process primaries are fluorescent-conventional ink mixtures. Using the PANTONE Color Matching System the following colors are selected to create a preferred embodiment of the invention:

| | |
|---|---|
| PANTONE Hexachrome ™ Process Yellow | 50 parts PANTONE 803<br>50 parts PANTONE Yellow 012 |

| -continued | |
|---|---|
| PANTONE Hexachrome ™ Process Orange | 20 parts PANTONE 804 |
| | 80 parts PANTONE Orange 021 |
| PANTONE Hexachrome ™ Process Magenta | 50 parts PANTONE 806 |
| | 50 parts PANTONE Rhodamine Red |
| PANTONE Hexachrome ™ Process Cyan | PANTONE Process Blue |
| PANTONE Hexachrome ™ Process Green | 80 parts PANTONE Green |
| | 20 parts PANTONE Yellow 012 |
| PANTONE Hexachrome ™ Process Black | PANTONE Process Black |

Other process colors can be created using different combinations of PANTONE fluorescent ink colors and PANTONE basic color ink. Further, non-PANTONE colors may be used to create a six color printing system.

In order to select the appropriate PANTONE Process color for the specific artwork or transparency, the originals are placed in a scanner, so that the C.I.E. coordinates are obtained for each incremental area. The C.I.E. coordinates are then plotted in a C.I.E. Diagram. In addition, the five PANTONE Hexachrome™ Process colors and their solid and screen tint intermixes with each other and black are plotted in this 3-D C.I.E. diagram. The best match for each scanned incremental area in the original artwork or color transparency is selected from the 3-D C.I.E. diagram of the PANTONE Hexachrome™ Process Color Solids and produced on film, or made directly into printing plates.

In particular, the following method may be used to print in six colors in accordance with the instant invention. Print grids or color patches of the various combinations of YOK, OMK, MCK, CGK, and GYK are made. Since only three colors are printing at any one time, they can be spaced 30° apart and no moire pattern will occur. Next, using a spectrophotometer, all grids or combinations are measured and then plotted in CIE color space. Based on this information, a look-up table is constructed (i.e. an inktable or color transform). Thereafter, the artwork is scanned in an RGB format and converted to XYZ coordinates so that it can be plotted in CIE color space.

For each scanned spot, the look-up table is used to determine the six-color combination needed to match the color spot. No color correction is required. After the artwork is scanned, six films and plates are prepared and printed on a six-color press. Each of the above steps may be implemented by a combination of hardware and software components, much like those described with respect to prior art FIG. 1.

In a paper by Harold Boll entitled, "A Color to Colorant Transformation for a Seven Ink Process" at IS&T/SPIE Symposium on Electronic Imaging, Science & Technology; 6-10 Feb. 1991; San Jose, Calif., which is incorporated herein for reference, another method for printing a set of inks is disclosed. This process is readily transferrable to a six color system. For lithographic printing, three colors plus black may be needed for increased density in the shadow areas.

In this method, print grids (color patches) of the various combinations of YOMK, OMCK, MCGK, CGYK and GYOK are formed. Since four colors may be printing at any one time, moire could be a problem if conventional screens are used. In a four color process, yellow is put at 90°, which is only 15° from magenta and cyan. However, yellow is not a very visible color so that the moire pattern that forms is usually not too visible. However, for the four color combinations that do not contain yellow (OMCK and MCGK), all the colors are very visible and the moire patterns would be visually significant. One method for minimizing the moire is to print three colors at 150 line screen 30 degrees apart, and print the fourth color at 200 line screen at any angle. Unfortunately, this does not eliminate the moire pattern for all tint combinations, because the dots are still in an orderly arrangement even though the spacing between dots has been changed. The variability of the imagesetter that prepares the films can also contribute to this moire problem.

In order to eliminate the moire, any of the following methods may be used: (1) Print three colors at conventional angles and print the fourth color in a stochastic screen; (2) Print all colors in stochastic screens; or (3) Print three colors plus black only if yellow is one of the primaries. Yellow can then be placed at 90° as in four color process printing. For the three colors and black grids that would contain no yellow, print only two colors plus black as in the method described above. The combinations to prepare the grids would then be YOMK, MCK, CGYK and GYOK.

Thereafter, the next step for lithographic printing is to measure all color combinations, plot the color combinations in CIE color space and construct a look-up table based thereon. Next, the artwork is scanned and plotted in CIE color space.

Based thereon, the six-color combinations must be determined using the look up table. Predictions are more complex than the method described above, since more than one solution is available. For example, a dirty orange can be matched with O+K, Y+M+K, or Y+O+M+K. The problems arises when the computer selects different formulations for adjacent areas that are slightly different in color. During a production run on a printing press, as ink films move up and down, the adjacent colors could move in opposite directions causing a discontinuity which would be visually unpleasant.

To minimize this problem, two flanking colors are replaced with the middle color plus black. For example, YOM–O+K. By restricting the number of combinations to a certain percentage, the possible number of predictions is minimized.

Figure 5:
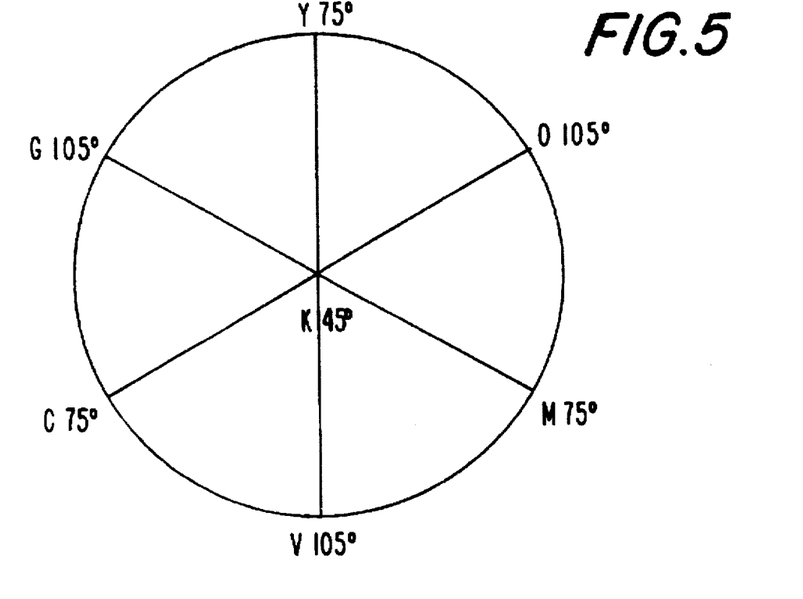
FIG. 5 discloses the color screen angles in a seven process color printing system.
Figure 6:
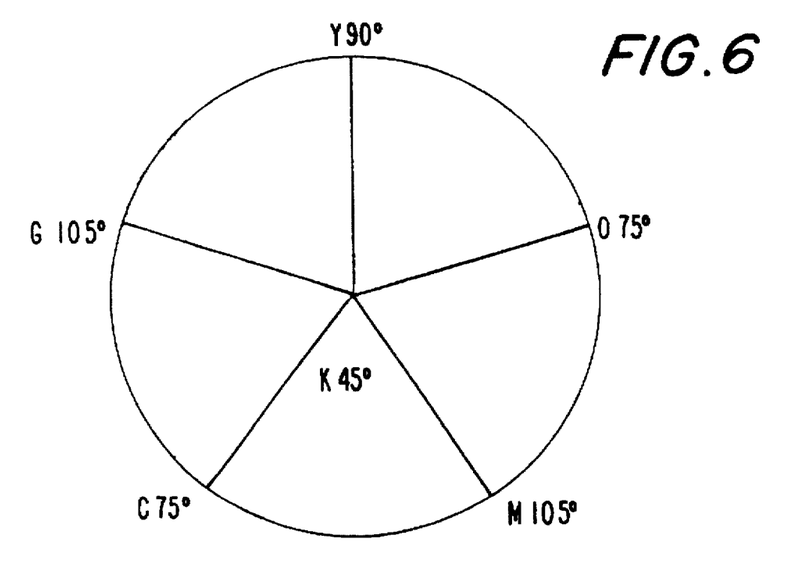
FIG. 6 discloses the color screen angles in a six process color printing system in accordance with the present invention.

In a seven-color process system as disclosed by Boll, if no more than two colors and black are ever used in any one incremental area, a 30 degree angle separation between colors can be maintained. This angle separation eliminates moire patterns. The screen angles for a seven-color printing system is shown in FIG. 5. If an even number of colors are selected, and for the present invention six colors, yellow would need to be placed at 90 degrees as shown in FIG. 6.

In addition, some of the new screening techniques may be used to eliminate moiré, such as frequency modulation or stochastic screening. In these arrangements, the positioning of the half tone dots being printed are randomized so repeating patterns that cause moire are eliminated. Another method to reduce potential moiré problems is to vary the line screen rulings. For example, some colors can be printed at 150 lpi, while others can be printed at 200 lpi.

To create a high fidelity color system, the ability to select either solid colors or six-color tints will be necessary. In most desktop publishing applications, named color system selectors or "pickers" are present along with generic color pickers such as RGB (Red Green Blue) and CMYK (Cyan, Magenta, Yellow, Black). While these selectors can still be used in a High Fidelity System, more precise color selection is necessary. As a CMYK selector model is critical for a four color process, a similar model for a six color system is important as described above.

Therefore, a color selector for a six color system (e.g. yellow-orange-magenta-cyan-green-black) may be used.

Once color is selected, all six variables will be tracked from within the computer graphics application.

Another important aspect of six color separation is the screening. As shown above with respect to FIG. 5, the angle separation or stochastic screening eliminates moire patterns. A crucial feature to any screening system.

Second, the tonal range of natural images must be preserved during the separation process. This requires adequate discrete steps in the image setting process to ensure that banding does not occur. Therefore, as the color gamut is improved, the resolution and screening of the images are improved.

Figure 7:
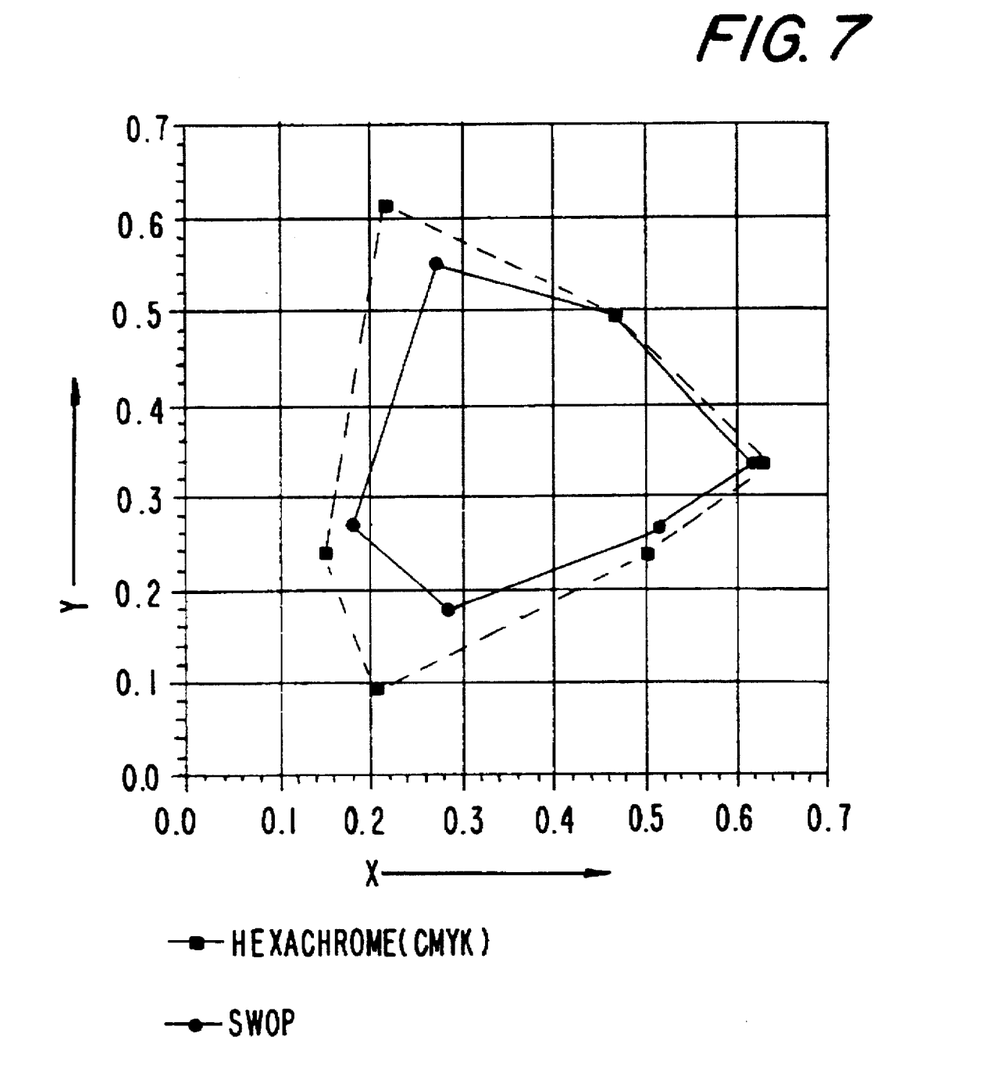
FIG. 7 is a graph disclosing the relationship between a SWOP 4-color process system and a six color CMYK system in a C.I.E. Chromaticity Diagram.

In addition, a side benefit of the PANTONE Hexachrome™ Process Color System is that six color CMYK also represents an expanded color gamut as compared to SWOP. This can be seen from the CIE plots of SWOP vs. a six color CMYK as shown in FIG. 7.

Finally, the six color system is a practical application for the printer. The printer may dedicate one 6-color press to either the PANTONE Hexachrome™ 6-color printing, or use the PANTONE Hexachrome™ CMYK units for HiFi 4-color printing. This eliminates wash-up time and ink loss due to switching from six color to SWOP and vice-versa. This should be a considerable competitive advantage for any commercial printer. The color separation methods would be similar to SWOP.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printing system for high fidelity printing of an image, comprising: a print grid including a combination of the color black and five basic ink colors, three to five of which having a predetermined portion of fluorescence.

2. The printing system of claim 1, further including a spectrophotometer for measuring said color combinations in said print grid.

3. The printing system of claim 2, further including a plotter for plotting readings from said spectrophotometer in CIE color space and creating a look up table based on said readings.

4. The printing system of claim 3, further including a scanner means for scanning said image in a RGB format and converting said scanned information into XYZ coordinates so as to be plotted in CIE color space and for determining from said look up table the color combination for each scanned spot.

5. The printing system of claim 1, wherein said basic colors are selected from a group consisting essentially of PANTONE Yellow, PANTONE Yellow 012, PANTONE Yellow 013, PANTONE Process Yellow, PANTONE Orange 021, PANTONE Warm Red, PANTONE Red 032, PANTONE Red 033, PANTONE Rubine Red, PANTONE Magenta 052, PANTONE Process Magenta, PANTONE Rhodamine Red, PANTONE Purple, PANTONE Violet, PANTONE Violet 063, PANTONE Blue 072, PANTONE Reflex Blue, PANTONE Process Cyan, PANTONE Process Blue, PANTONE Blue 082, PANTONE Green, and PANTONE Green 092.

6. The six color printing system of claim 1, wherein said colors having at least a portion of fluorescence are selected from a group consisting essentially of PANTONE Fluorescent Blue 801, PANTONE Fluorescent Green 802, PANTONE Fluorescent Yellow 803, PANTONE Fluorescent Orange 804, PANTONE Fluorescent Warm Red 805, PANTONE Fluorescent Magenta 806, and PANTONE Fluorescent Purple 807.

7. The six color printing system of claim 5, wherein said colors having at least a portion of fluorescence are selected from a group consisting essentially of PANTONE Fluorescent Blue 801, PANTONE Fluorescent Green 802, PANTONE Fluorescent Yellow 803, PANTONE Fluorescent Orange 804, PANTONE Fluorescent Warm Red 805, PANTONE Fluorescent Magenta 806, and PANTONE Fluorescent Purple 807.

8. The six color printing system of claim 1, wherein said black is PANTONE Process Black.

9. The six color printing system of claim 5, wherein said black is PANTONE Process Black.

10. The six color printing system of claim 7, wherein said black is PANTONE Process Black.

11. The six color printing system of claim 1, wherein said six colors include black and three basic colors two of which have a portion of fluorescence.

12. The six color printing system of claim 1, wherein said five colors include PANTONE Hexachrome™ Process Yellow comprising 50 parts PANTONE Fluorescent Yellow 803 and 50 parts PANTONE Yellow 012; PANTONE Hexachrome™ Process Orange comprising 20 parts PANTONE Fluorescent Orange 804 and 80 parts PANTONE Orange 021; PANTONE Hexachrome™ Process Magenta comprising 50 parts PANTONE fluorescent Magenta 806 and 50 parts PANTONE Rhodamine Red; PANTONE Hexachrome™ Process Cyan comprising 100 parts PANTONE Process Blue; and PANTONE Hexachrome™ Process Green comprising 80 parts PANTONE Green and 20 parts PANTONE Yellow 012, and PANTONE Hexachrome™ Process Black comprising 100 parts PANTONE Process Black.

13. A dye set for a printing system for high fidelity printing of an image, comprising: a combination of the color black and five basic ink colors, three to five of which having a predetermined portion of fluorescence.

* * * * *